(12) United States Patent
Park (10) Patent No.: US 9,630,583 B2
(45) Date of Patent: Apr. 25, 2017

(54) PASSENGER IDENTIFICATION DEVICE INCLUDING BIDIRECTIONAL ERROR MOMENT ABSORPTION STRUCTURE

(71) Applicant: HYUNDAI MOBIS CO., LTD., Seoul (KR)

(72) Inventor: Byung Hyuk Park, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 291 days.

(21) Appl. No.: 14/538,351

(22) Filed: Nov. 11, 2014

(65) Prior Publication Data
US 2016/0107596 A1 Apr. 21, 2016

(30) Foreign Application Priority Data
Oct. 16, 2014 (KR) .................. 10-2014-0139906

(51) Int. Cl.
| | | |
|---|---|---|
| B60R 21/015 | (2006.01) | |
| B60N 2/005 | (2006.01) | |
| G01G 19/12 | (2006.01) | |
| G01G 23/06 | (2006.01) | |
| F16B 39/10 | (2006.01) | |
| B60N 2/00 | (2006.01) | |
| B60N 2/07 | (2006.01) | |
| G01G 19/414 | (2006.01) | |
| G01G 23/00 | (2006.01) | |

(52) U.S. Cl.
CPC ........ B60R 21/01516 (2014.10); B60N 2/002 (2013.01); B60N 2/0732 (2013.01); G01G 19/4142 (2013.01); G01G 23/06 (2013.01); F16B 39/108 (2013.01); G01G 23/002 (2013.01)

(58) Field of Classification Search
CPC .... G01G 19/08; G01G 19/12; G01G 19/4142; G01G 23/002; G01G 23/06; B60N 2/002; B60N 2/0732; B60R 21/01516; F16B 39/108
See application file for complete search history.

(56) References Cited

U.S. PATENT DOCUMENTS

| | | | | |
|---|---|---|---|---|
| 409,596 | A * | 8/1889 | Motherwell | ............ F24B 1/198 52/36.3 |
| 440,331 | A * | 11/1890 | Rogers | ..................... F16B 4/004 411/424 |
| 1,480,885 | A * | 1/1924 | Grossmann | ........... F16B 39/108 411/201 |
| 1,595,026 | A * | 8/1926 | Sherman | ................ F16B 39/108 411/221 |

(Continued)

FOREIGN PATENT DOCUMENTS

| | | |
|---|---|---|
| KR | 10-2008-0018018 A | 2/2008 |
| KR | 10-2010-0021925 A | 2/2010 |

*Primary Examiner* — Randy Gibson (57) ABSTRACT

Disclosed is a passenger identification device including: a weight sensor assembled to a seat of a vehicle, sensing a weight of a passenger and including a stud unit that protrudes upward; a base bracket positioned on the top of the weight sensor and mediating mounting of the weight sensor; an upper damper and a lower damper contacting the top and the bottom of the base bracket, respectively to absorb an error moment; and an upper sleeve and a lower sleeve positioned on the top of the upper damper and the bottom of the lower damper, respectively and used to fix the position of the damper and protect the damper.

16 Claims, 6 Drawing Sheets

(56) References Cited

U.S. PATENT DOCUMENTS

| | | | | |
|---|---|---|---|---|
| 1,966,835 A * | 7/1934 | Stites | F16B 4/004 | |
| | | | 411/424 | |
| 1,969,796 A * | 8/1934 | Hoke | F16B 33/004 | |
| | | | 411/366.1 | |
| 2,113,424 A * | 4/1938 | Crowther | F16B 39/26 | |
| | | | 29/509 | |
| 2,141,701 A * | 12/1938 | Uherkovich | F16B 39/24 | |
| | | | 411/245 | |
| 3,478,802 A * | 11/1969 | Poccard | F16B 21/125 | |
| | | | 411/116 | |
| 5,080,545 A * | 1/1992 | McKinlay | F16B 39/282 | |
| | | | 411/136 | |
| 5,478,975 A * | 12/1995 | Ford | F16B 35/041 | |
| | | | 177/210 FP | |
| 5,772,373 A * | 6/1998 | Cronin, II | B25B 13/48 | |
| | | | 411/120 | |
| 6,010,290 A * | 1/2000 | Slesinski | F16B 39/108 | |
| | | | 411/226 | |
| D469,005 S * | 1/2003 | Ellis | D8/387 | |
| 6,677,539 B2 * | 1/2004 | Miura | G01L 1/2206 | |
| | | | 177/136 | |
| 6,758,646 B1 * | 7/2004 | Ishida | F16B 39/028 | |
| | | | 411/119 | |
| 7,373,846 B2 * | 5/2008 | Furukawa | G01N 3/02 | |
| | | | 177/136 | |
| 7,455,343 B2 * | 11/2008 | Endo | B60N 2/002 | |
| | | | 296/65.13 | |
| 7,836,997 B2 * | 11/2010 | Takayasu | B60N 2/002 | |
| | | | 177/136 | |
| 8,136,619 B2 * | 3/2012 | Hwang | B60N 2/002 | |
| | | | 177/136 | |
| 2002/0119027 A1 * | 8/2002 | Nago | F16B 39/108 | |
| | | | 411/119 | |
| 2006/0054766 A1 * | 3/2006 | Sulkowski | B60R 21/01516 | |
| | | | 248/346.01 | |
| 2009/0103998 A1 * | 4/2009 | Gagneur | F16B 39/108 | |
| | | | 411/196 | |
| 2013/0280006 A1 * | 10/2013 | Desantis | G21C 7/12 | |
| | | | 411/113 | |

\* cited by examiner

FIG. 1

<PRIOR ART>

PASSENGER IDENTIFICATION DEVICE INCLUDING BIDIRECTIONAL ERROR MOMENT ABSORPTION STRUCTURE

CROSS-REFERENCE TO RELATED APPLICATIONS

This application claims priority to and the benefit of Korean Patent Application No. 10-2014-0139906 filed in the Korean Intellectual Property Office on Oct. 16, 2014, the entire contents of which are incorporated herein by reference.

TECHNICAL FIELD

The present invention relates to a passenger identification device. More particularly, the present invention relates to a passenger identification device adopting a weight sensor mounting structure optimized for absorbing an error moment.

BACKGROUND ART

In general, an airbag, as a device that absorbs a physical impact generated when a vehicle collides by using elasticity of an air cushion to protect a passenger in the vehicle, is divided into a driver-seat airbag, a passenger-seat airbag, a side airbag, a curtain airbag, and the like.

However, since an expansion speed of the airbag cushion expanded by input of airbag gas when the vehicle collides is performed at a high speed for protecting the passenger, when the passenger is a child or a person having a small weight, the passenger may be rather injured due to an impact by the expansion of the air cushion.

In order to prevent the injury, a plurality of weight sensors that senses a weight of the passenger is disposed on a passenger seat, and whether the passenger is seat on the passenger seat is sensed and whether the seated passenger is a child, an adult having a small weight, such as a woman, or a general adult is distinguished by sensing the weight of the passenger through the plurality of weight sensors, and as a result, the expansion of the airbag and an expansion condition of the airbag are changed according to a condition of the passenger who seats on the passenger seat.

Figure 1:
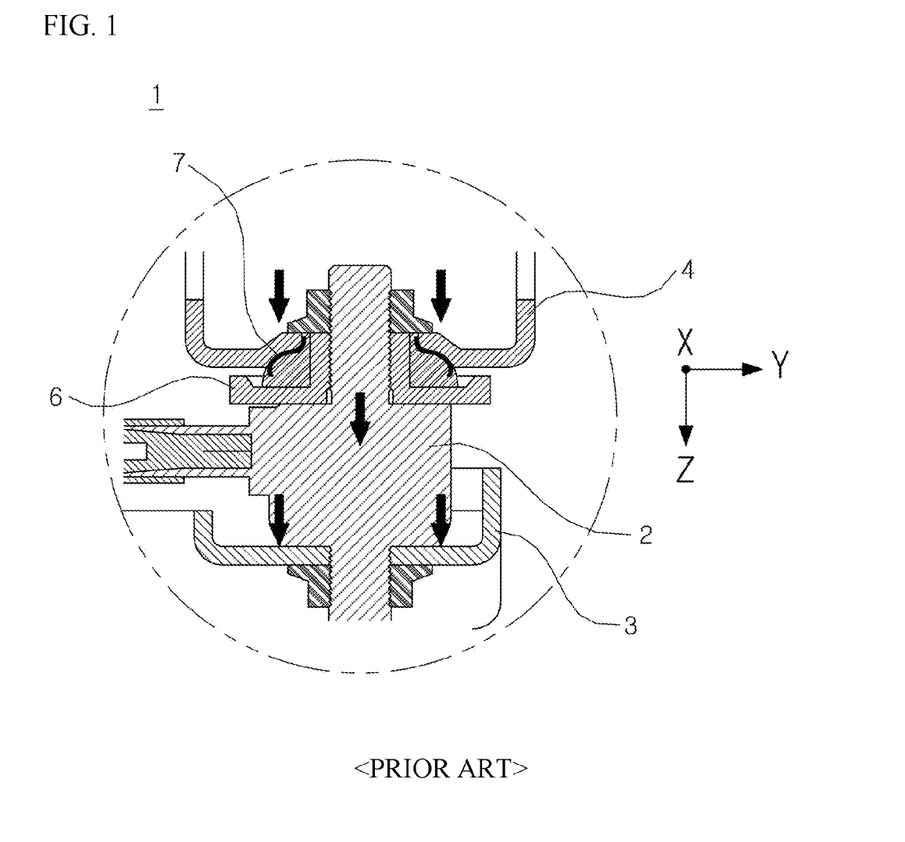
FIG. 1 is a cross-sectional view illustrating a structure of a weight sensor mounting unit of a weight-recognition type passenger identification device in the related art.

FIG. 1 is a diagram illustrating a structure of a weight sensor mounting unit of a weight-recognition type passenger identification device in the related art.

Referring to FIG. 1, a weight sensor mounting unit 1 of the weight recognition type passenger identification device in the related art has a structure in which a weight sensor 2 is fixed to a seat base bracket 3 and a load of a seat is transferred to the weight sensor 2 through a top bracket 4 of the passenger identification device, and an error moment of the sensor mounting unit is absorbed by using a single number of damper 5, and a single number of sleeve 6, and a forming shape 7 of the top bracket 4 on the bottom of the top bracket 4.

However, the error moment absorption structure of the existing weight sensor mounting unit has a problem in which manufacturing the shapes of the bracket and the damper is complicated because the forming structure of the top bracket and the damper positioned on the top of the weight sensor is required.

Further, since the error moment absorption structure is formed on the top of the weight sensor in a single damping structure, because a Z-direction moment needs to be accompanied in order to absorb an X or Y-directional error moment, an X or Y unidirectional and Z and X or Y-directional complex error moments cannot be effectively absorbed, and as a result, it is difficult to efficiently absorb the complex error moment which occurs in a level control unit at the time of controlling the level of the seat.

SUMMARY OF THE INVENTION

The present invention has been made in an effort to provide a passenger identification device in which absorption performance of an error moment is improved.

The present invention has also been made in an effort to provide a passenger identification device that distributes a load that concentrates on a damper in the existing structure to improve durability of a system and simplify a manufacturing process.

An exemplary embodiment of the present invention provides a passenger identification device including: a weight sensor sensing a weight of a passenger who takes on a seat and including a stud unit that protrudes upward; a base bracket positioned on the top of the weight sensor and mediating mounting of the weight sensor; an upper damper and a lower damper contacting the top and the bottom of the base bracket, respectively to absorb an error moment; and an upper sleeve and a lower sleeve positioned on the top of the upper damper and the bottom of the lower damper, respectively and used to fix the position of the damper and protect the damper.

A through-hole may be formed in the base bracket, an upper damper via-hole and a lower damper via-hole may be formed in the upper damper and the lower damper, and an upper sleeve via-hole and a lower sleeve via-hole may be formed in the upper sleeve and the lower sleeve, the stud unit may penetrate the through-hole and the via-holes and a thread may be formed in the stud unit penetrating the upper sleeve to be coupled by a nut, and the via-holes may be formed depending on a cross-sectional shape of the stud unit.

An upper protrusion and a lower protrusion formed along the inner peripheral surfaces of the upper damper via-hole and the lower damper via-hole may be formed in the upper damper and the lower damper, and the upper protrusion and the lower protrusion may be inserted into the through-hole formed in the base bracket.

The upper protrusion and the lower protrusion may be positioned to contact each other in the through-hole.

The stud unit may be divided into a first stud unit at a portion penetrating the upper sleeve and a second stud unit below the upper sleeve, and the first stud unit may have a smaller cross-section than the second stud unit.

An upper support unit and a lower support unit for fixing the upper damper and the lower damper may be formed in the upper sleeve and the lower sleeve.

The upper support unit and the lower support unit may be formed along the outer peripheral surfaces of the upper sleeve and the lower sleeve.

The upper damper and the lower damper may be formed by elastic bodies.

The upper damper and the lower damper may have a quadrangular shape and corners of the dampers may be rounded.

A position guide may be formed in the lower sleeve, and the position guide may be coupled with a protrusion guide formed in the weight sensor.

The position guide may be formed by a space recessed inside, and the protrusion guide may have a protrusion shape to be inserted into the position guide.

A chamfer may be formed at the end of one side of the stud unit.

The first stud unit may have a cylindrical shape and the second stud unit may have a polygonal shape.

According to exemplary embodiments of the present invention, a passenger identification device adopts bidirectional error moment absorption structures to improve error moment absorption performance.

Further, passenger identification performance may be improved by increasing an error moment absorption dimension and a manufacturing process may be simplified by removing a forming unit.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiments of the present invention will be described in detail with reference to the accompanying drawings in order to clarify a method of solving the technical problems of the present invention. However, when a description of the related art still obscures the spirit of the present invention in describing the present invention, a description thereof will be omitted. The terms used in the following description are defined considering the functions of the present invention and may vary depending on the intention or usual practice of a designer or manufacturer. Therefore, the definitions should be made based on the entire contents of the present specification. Parts indicated by like reference numerals refer to like elements throughout the specification.

Figure 2:
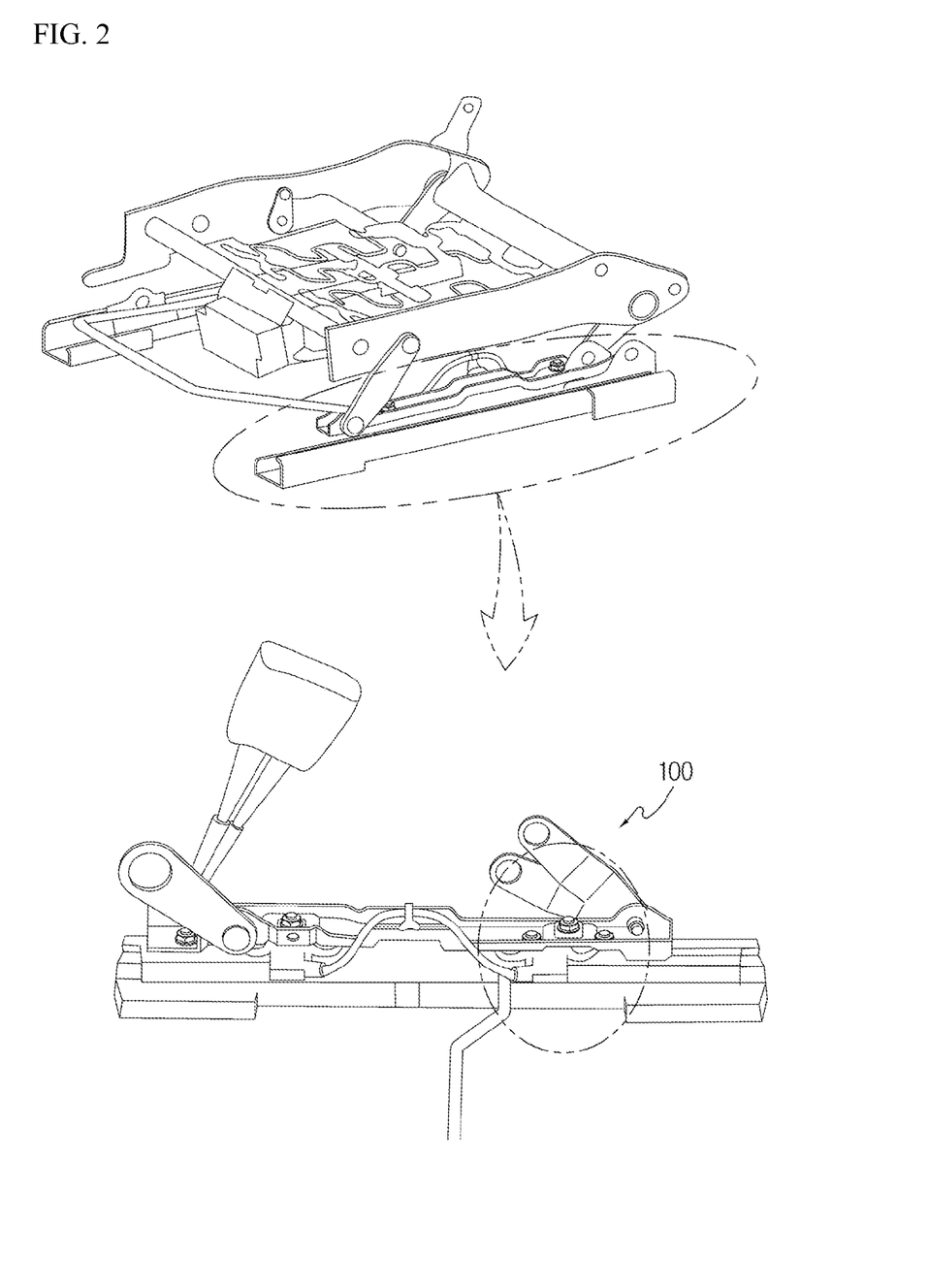
FIG. 2 is a diagram illustrating a structure of a weight sensor mounting unit of a passenger identification device according to an exemplary embodiment of the present invention.
Figure 3:
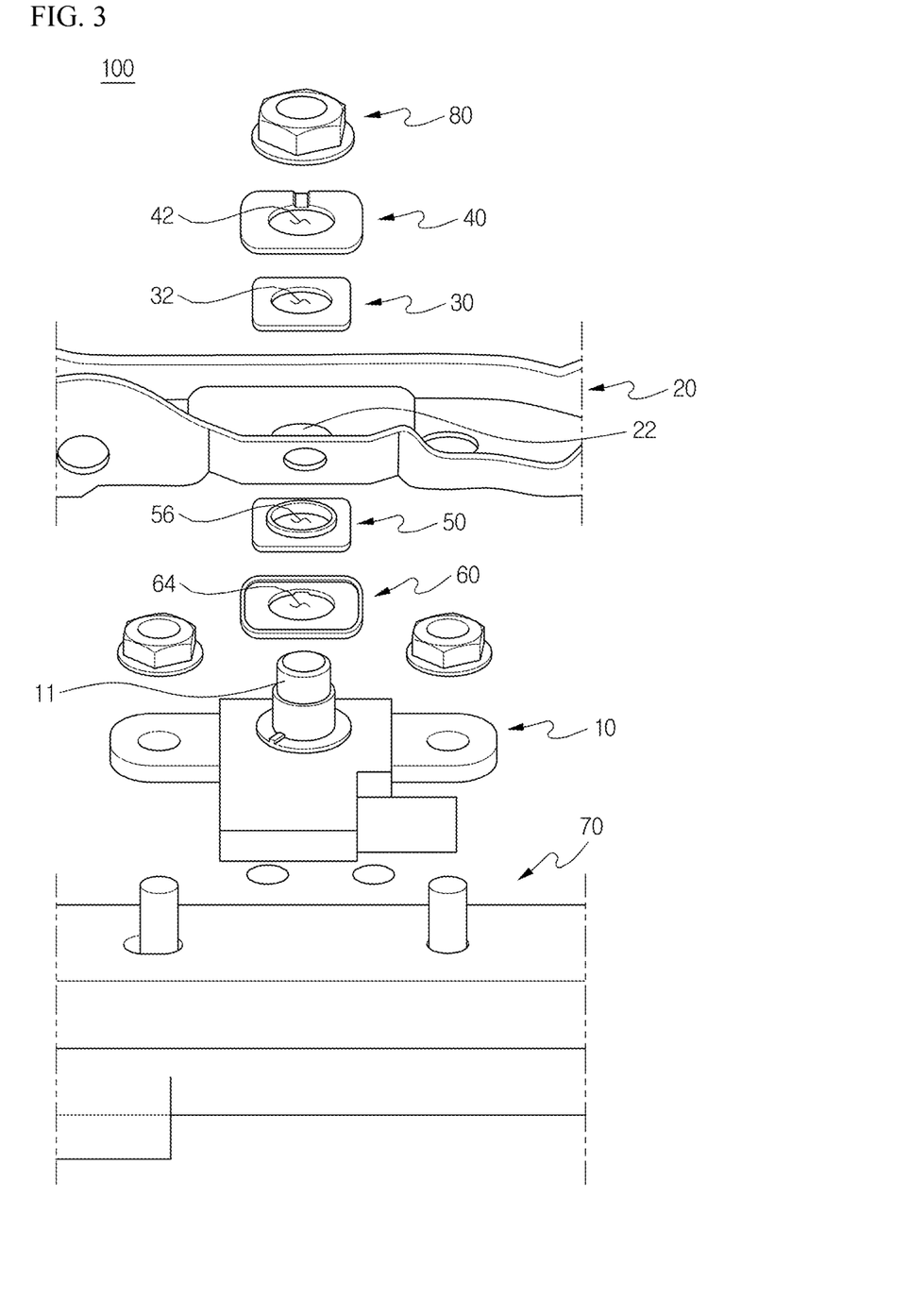
FIG. 3 is an exploded perspective view illustrating a weight sensor mounting structure of FIG. 2.
Figure 4:
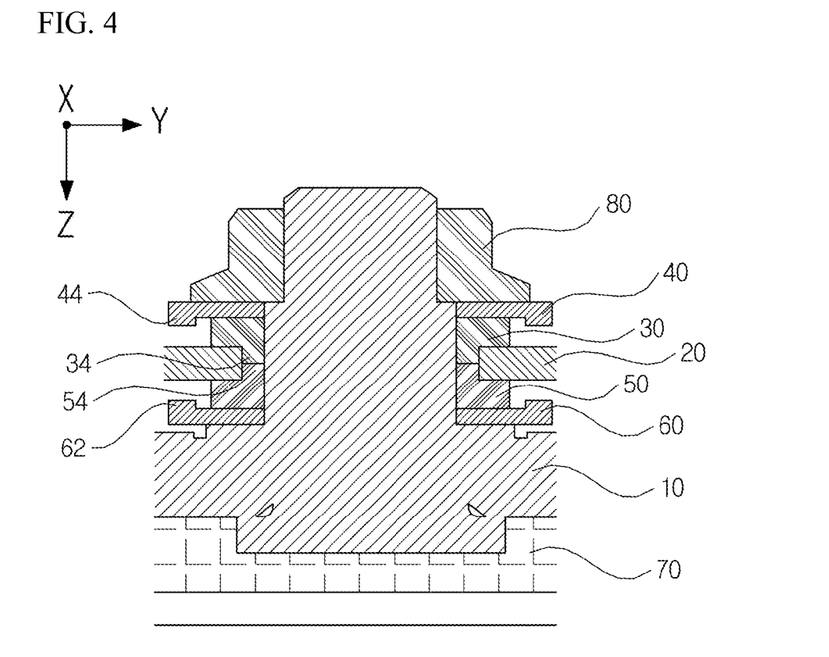
FIG. 4 is a cross-sectional view of the weight sensor mounting structure of FIG. 2.

FIG. 2 is a diagram illustrating a weight sensor mounting structure of a passenger identification device according to an exemplary embodiment of the present invention. FIG. 3 is an exploded perspective view illustrating the weight sensor mounting structure of FIG. 2. FIG. 4 is a cross-sectional view of the weight sensor mounting structure of FIG. 2.

Referring to FIGS. 2 to 4, a weight sensor mounting structure of the passenger identification device 100 according to the exemplary embodiment of the present invention may include a weight sensor 10, a base bracket 20, an upper damper 30 and a lower damper 50, and an upper sleeve 40 and a lower sleeve 60.

The weight sensor 10 is mounted on the top of a seat track rail 70 of a vehicle and senses a weight of a passenger. A pillar stud unit 11 that protrudes upward may be formed in the weight sensor 10. The weight sensor 10 measures the weight of the passenger that takes the seat to transfer the measured weight to an airbag control unit (ACU, not illustrated).

The base bracket 20 is positioned above the weight sensor 10 and may mediate mounting of the weight sensor 10. A through-hole 22 through which the stud unit 11 of the weight sensor 10 passes may be formed in the base bracket 20 and the through-hole 22 may be larger than a diameter and a cross section of the stud unit 11. An upper protrusion 34 (not illustrated) formed in the upper damper 30 and a lower protrusion 54 formed in the lower damper 50 are inserted into the through-hole 22 and a cross-sectional shape of the through-hole 22 may be variously modified by the shapes of the upper protrusion 34 (not illustrated) and the lower protrusion 54 which are inserted.

The upper damper 30 and the lower damper 50 are coupled to the top and the bottom of the base bracket 20 to absorb the error moment which occurs at the time of controlling the level of the seat.

An upper damper through-hole 32 and a lower damper through-hole 56 may be formed at the centers of the upper damper 30 and the lower damper 50, respectively and the stud unit 11 may be inserted into each of the upper damper though-hole 32 and the lower damper through-hole 56.

The upper damper through-hole 32 and the lower damper through-hole 56 may have shapes which are the same as a cross-sectional shape of the stud unit 11. As an exemplary embodiment, when the cross-sectional shape of the stud unit 11 is a polygon, the upper damper through-hole 32 and the lower damper through-hole 56 may also have a polygonal shape.

The upper protrusion 34 and the lower protrusion 54 may be formed on the inner peripheries of the upper damper through-hole 32 and the lower damper through-hole 56, and the upper protrusion 34 and the lower protrusion 54 may be inserted into the through-hole 22 formed in the base bracket 20. As an exemplary embodiment, the upper protrusion 34 and the lower protrusion 54 may be coupled to contact each other in the through-hole 22.

The thicknesses of the upper protrusion 34 and the lower protrusion 54 may be formed with a half thickness of a difference between the diameter of the through-hole 22 and the diameter of the stud unit 11.

The outer peripheral surfaces and the inner peripheral surfaces of the upper protrusion 34 and the lower protrusion 54 may be provided to have the polygonal shape in order to prevent rotation when the upper damper 30 and the lower damper 50 are coupled to each other. In this case, a polygonal structure of the inner peripheral surface may be determined depending on a cross-sectional shape of the stud unit 11 and a polygonal structure of the outer peripheral surface may be determined depending on the shape of the through-hole 22 of the base bracket. The polygonal structure of the inner peripheral surface and the polygonal structure of the outer peripheral surface are different from each other to increase efficiency of preventing the rotation when the dampers are coupled to each other.

The upper damper 30 and the lower damper 50 have a quadrangular shape in order to secure a maximum error moment absorption dimension in a narrow assembly space, and the shape is simplified by removing the forming structure in the related art to simplify a manufacturing process.

The upper sleeve 40 and the lower sleeve 60 are positioned on the top of the upper damper 30 and the bottom of the lower damper 50 and serve to fix the position of the damper and protect the damper.

An upper sleeve through-hole 42 and a lower sleeve through-hole 64 may be formed at the upper sleeve 40 and the lower sleeve 60, and the stud unit 11 may penetrate the upper sleeve though-hole 42 and the lower sleeve through-hole 64

The upper sleeve 40 and the lower sleeve 60 have larger areas than the upper damper 30 and the lower damper 50 in order to protect the upper damper 30 and the lower damper 50 and the shapes of the upper sleeve 40 and the lower sleeve 60 may be variously modified according to the shapes of the upper damper 30 and the lower damper 50.

An upper support unit 44 and a lower support unit 62 are formed in the upper sleeve 40 and the lower sleeve 60 in order to fix the upper damper 30 and the lower damper 50. The upper support unit 44 and the lower support unit 62 may be modified in various shapes for fixing the upper damper 30 and the lower damper 50.

FIG. 4 is a cross-sectional view of the weight sensor mounting structure according to the exemplary embodiment of the present invention.

Referring to FIG. 4, in the mounting structure of the weight sensor 10 of the passenger identification device 100 according to the exemplary embodiment, the weight sensor 10 may be fixed to a seat rail of the vehicle and a nut 80 may be coupled to the stud unit 11 of the weight sensor 10, which penetrates the lower sleeve 60, the lower damper 50, the base bracket 20, the upper damper 30, and the upper sleeve 40.

Male and female threads are formed to couple the stud unit 11 and a screw. The nut 80 is just an example embodiment for fixing the weight sensor 10 and may be modified to various techniques for fixing the weight sensor 10.

The upper protrusion 34 of the upper damper 30 and the lower protrusion 54 of the lower damper 50 contact each other and the inner peripheral surface of the through-hole 22 of the base bracket 20 contacts the upper protrusion 34 and the lower protrusion 54 to be assembled so as not to contact the stud unit 11 of the weight sensor 10.

Like this, in the mounting structure of the weight sensor 10, the bidirectional error moment absorption structure is applied to improve the error moment absorption performance in the related art.

Figure 5:
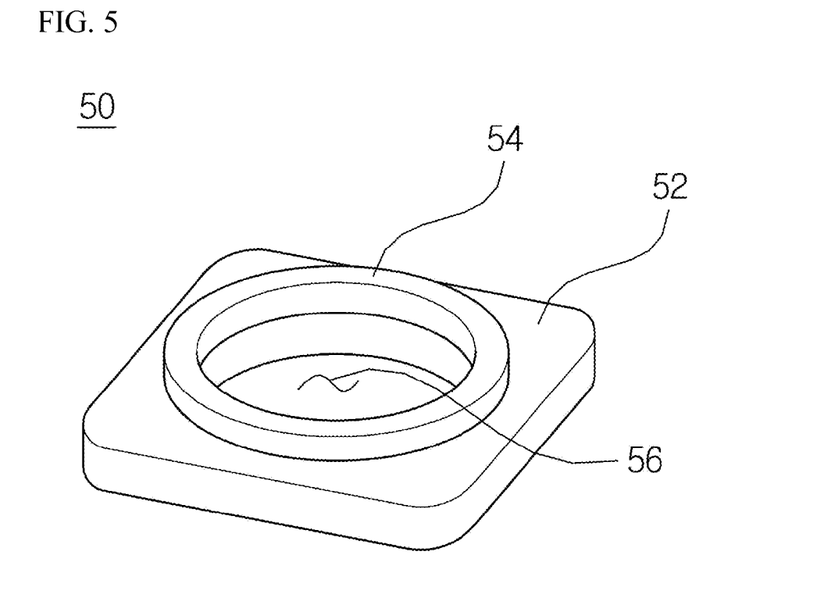
FIG. 5 is a diagram illustrating a shape of a lower damper which is a component of the weight sensor mounting structure according to the exemplary embodiment of the present invention.

FIG. 5 is a diagram illustrating a shape of a lower damper which is a component of the weight sensor mounting structure according to the exemplary embodiment of the present invention.

Referring to FIG. 5, the lower damper 50 may be formed by a plate having a predetermined thickness. As an exemplary embodiment, the lower damper 50 is configured by a quadrangular plate and an edge of the lower damper 50 may be rounded. Further, the lower damper through-hole 56 for inserting the stud unit 11 may be formed and may be variously modified according to the cross-sectional shape of the inserted stud unit 11.

The lower protrusion 54 inserted into the through-hole 22 formed in the base bracket 20 is provided in the lower damper through-hole 56. The lower protrusion 54 is formed on the inner peripheral surface of the through-hole. As an exemplary embodiment, the inner peripheral surface of the lower protrusion 54 may be formed according to the cross-sectional shape of the stud unit 11, and the outer peripheral surface of the lower protrusion 54 may be formed according to the shape of the through-hole 22 formed in the base bracket 20.

The lower protrusion 54 may have the polygonal shape in order to fix the lower damper 50.

The lower damper 50 may be made of an elastic material in order to absorb the error moment and may be made of various materials capable of absorbing the load.

The lower damper 50 and the upper damper 30 may have the same configuration and a description of the lower damper 50 may be similarly applied even to the upper damper 30.

Figure 6:
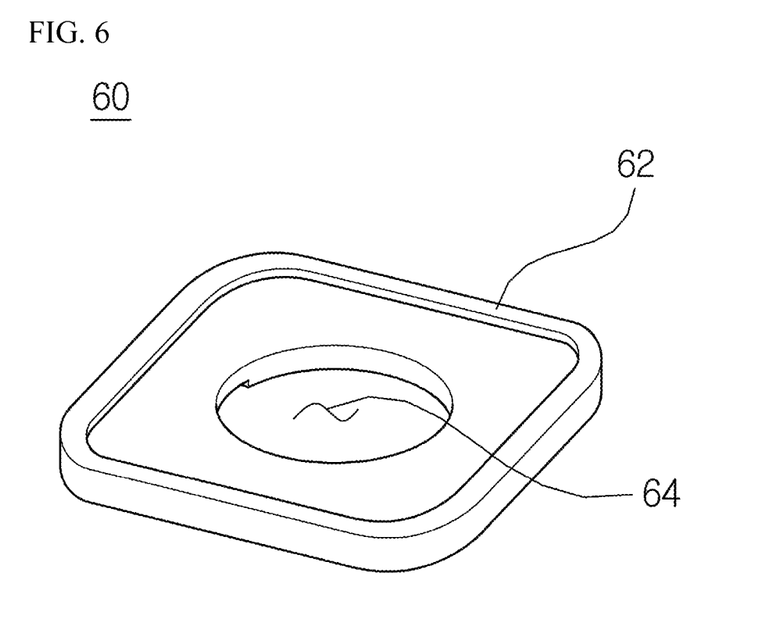
FIG. 6 is a diagram illustrating a shape of a lower sleeve which is a component of the weight sensor mounting structure when viewed from the top according to the exemplary embodiment of the present invention.
Figure 7:
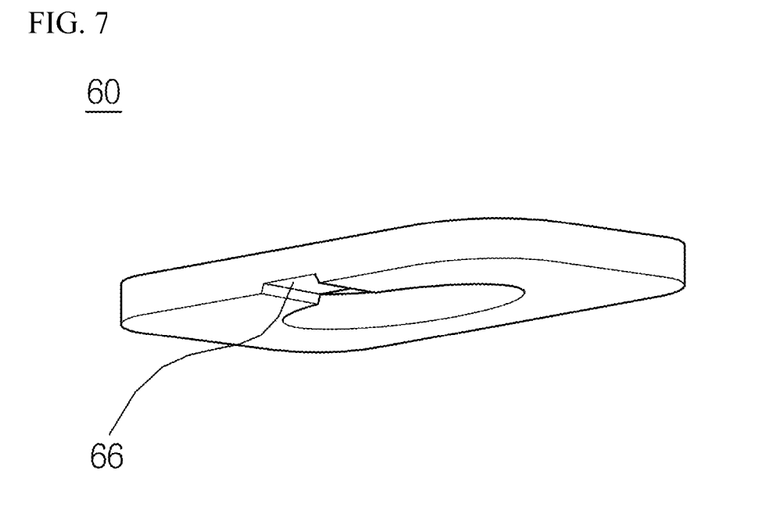
FIG. 7 is a diagram illustrating a shape of the lower sleeve of FIG. 6 when viewed from the bottom.

FIG. 6 is a diagram illustrating a shape of a lower sleeve which is a component of the weight sensor mounting structure when viewed from the top according to the exemplary embodiment of the present invention. FIG. 7 is a diagram illustrating the shape of the lower sleeve when viewed from the bottom.

Referring to FIGS. 6 and 7, the lower sleeve may be a plate having a predetermined thickness. The lower sleeve 60 may include the lower support unit 62, a lower sleeve through-hole, and a position guide 66.

The lower sleeve 60 has the same cross-sectional shape as the lower damper 50 in order to fix the position of the lower damper 50 and protect the lower damper 50, and the cross section of the lower sleeve 60 is larger than the cross section of the lower damper 50.

The lower support unit 62 may serve to guide the lower damper 50 so as to be seat when being coupled with the lower damper 50 and may be formed to protrude along the outer peripheral surface of the lower sleeve 60. As an exemplary embodiment, when the edge of the lower damper 50 is rounded, the lower support unit 62 may be formed to be rounded.

The stud unit 11 may be inserted into the lower sleeve through-hole 64. The lower sleeve through-hole 64 may be formed according to the cross-sectional shape of the stud unit 11.

The position guide 66 is formed on the bottom of the lower sleeve and coupled with a protrusion guide 18 formed in the weigh sensor 10 to prevent the lower sleeve 60 from moving.

As an exemplary embodiment, the position guide 66 may be formed by a linear valley recessed inside, and a plurality of position guides 66 may be formed at the lower sleeve 60. The position guide 66 may be formed by a hole or a protrusion for fixing the lower sleeve 60 and be variously modified in various shapes for fixing the lower sleeve 60.

The upper sleeve 40 may have the same configuration as the lower sleeve 60 and a description of the lower sleeve 60 may be similarly applied even to the upper sleeve 40.

In the lower sleeve 60, a pillar shape of the sleeve reflected for controlling damper compression rate in the related art is removed and the absorption dimension is additionally secured in a space formed by removing the pillar to improve the error moment absorption performance, and a T-shape structure in the related art is simplified to achieve manufacturing easiness.

Figure 8:
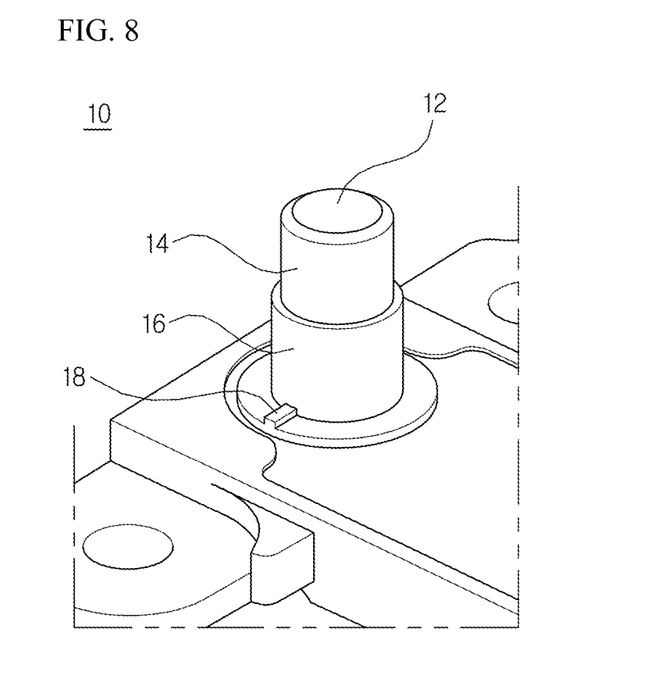
FIG. 8 is a diagram illustrating an exemplary embodiment of a weight sensor stud unit which is a component of the weight sensor mounting structure according to the exemplary embodiment of the present invention.
Figure 9:
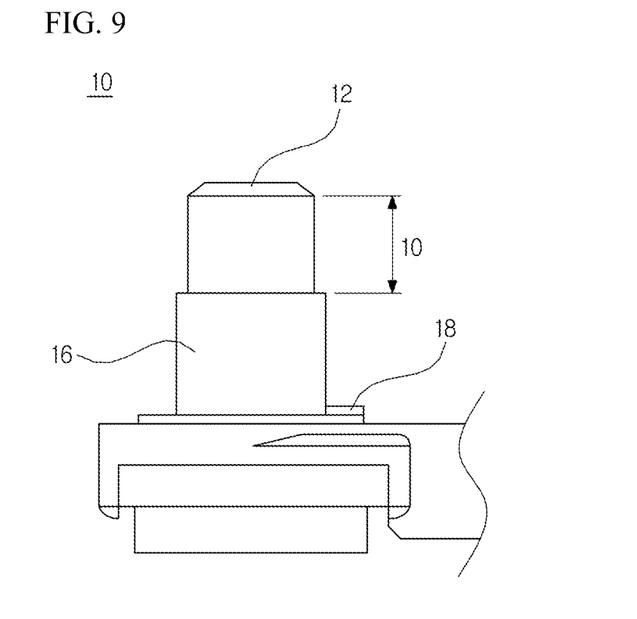
FIG. 9 is a diagram illustrating another exemplary embodiment of the weight sensor stud unit which is the component of the weight sensor mounting structure according to the exemplary embodiment of the present invention.

FIG. 8 is a diagram illustrating an exemplary embodiment of a weight sensor stud unit which is a component of the weight sensor mounting structure according to the exemplary embodiment of the present invention. FIG. 9 is a diagram illustrating another exemplary embodiment of the weight sensor stud unit which is the component of the weight sensor mounting structure according to the exemplary embodiment of the present invention.

FIGS. 8 and 9 illustrate exemplary embodiments for controlling the damper compression rate of the sleeve.

Referring to FIG. 8, the weight sensor 10 may include the stud unit 11 that protrudes upward and the protrusion guide 18 for being coupled with the position guide 66 of the lower sleeve 60.

The stud unit 11 may include a first stud unit 14 penetrating the upper sleeve 40 and a second stud unit 16 positioned below the upper sleeve.

The first stud unit 14 may have a smaller cross-section than the second stud unit 16. The first stud unit 14 may have the thread for being coupled with the screw and a diameter of a screw hole formed in the screw may be the same as the diameter of the first stud unit 14. A jaw formed by a cross-sectional difference between the first stud unit 14 and the second stud unit 16 restrains movement of the screw to control the compression rate of the sleeve.

Further, corners of the top of the first stud unit 14 may be chamfers 12 for being easily coupled with each of the components.

The second stud unit 16 may have the polygonal shape in order to prevent the coupled components from moving. The purpose thereof is to prevent the damper or the sleeve from rotating when the load is applied to the passenger identification device 100.

The protrusion guide 18 is formed on an adjacent surface of the stud unit 11 and is coupled with the position guide 66 of the lower sleeve 60 to restrain the movement of the lower sleeve 60. The protrusion guide 18 may be variously modified according to the shape of the position guide 66.

Referring to FIG. 9, the stud unit 11 provided in the weight sensor 10 may have the same cross-sectional shape as the second stud unit 16 without a change in cross-section and a thread having a predetermined length may be formed on the top of the second stud unit 16. The damper compression rate of the sleeve may be controlled by controlling a section where the thread is formed.

As an exemplary embodiment, the thread may be formed by considering an assembly tolerance up to a length required from the top of the stud unit 11.

As described above, according to the exemplary embodiments of the present invention, the passenger identification device adopts bidirectional error moment absorption structures to improve the error moment absorption performance.

Further, passenger identification performance is improved by increasing the error moment absorption dimension and the forming unit is removed to simplify the manufacturing process.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A passenger identification device, comprising:
a weight sensor sensing a weight of a passenger who takes on a seat, the weight sensor including a stud unit that protrudes upward;
a base bracket disposed over the weight sensor and mediating mounting of the weight sensor;
an upper damper and a lower damper contacting a top surface and a bottom surface of the base bracket, respectively, to absorb an error moment; and
an upper sleeve and a lower sleeve positioned on a top surface of the upper damper and a bottom surface of the lower damper, respectively, the upper and lower sleeves fixing and protecting the upper and lower dampers, respectively, the lower sleeve having a lower support unit and a lower sleeve through-hole,
wherein the lower sleeve further has a top surface that is adjacent to a peripheral surface of the lower sleeve through-hole and to an inner peripheral surface of the lower support unit, the top surface of the lower sleeve being a planar surface.

2. The device of claim 1, wherein:
the base bracket has a through-hole, the upper damper has an upper damper through-hole, the lower damper has a lower damper through-hole, and the upper sleeve has an upper sleeve through-hole,
the stud unit penetrates the through-hole of the base bracket, the upper damper through-hole, the lower damper through-hole, the lower sleeve through-hole, and the upper sleeve through-hole, and a thread is formed in the stud unit penetrating the upper sleeve to be coupled by a nut, and
the through-hole of the base bracket, the upper damper through-hole, the lower damper through-hole, the lower sleeve through-hole, and the upper sleeve through-hole are shaped depending on a cross-sectional shape of the stud unit.

3. The device of claim 2, wherein:
the upper damper further has an upper protrusion, the lower damper further has a lower protrusion, the upper protrusion and the lower protrusion being disposed along the inner peripheral surfaces of the upper damper through-hole and the lower damper through-hole, respectively, and the upper protrusion and the lower protrusion are inserted into the through-hole of the base bracket.

4. The device of claim 3, wherein the upper protrusion and the lower protrusion are positioned to contact each other in the through-hole of the base bracket.

5. The device of claim 2, wherein:
the stud unit is divided into a first stud unit at a portion penetrating the upper sleeve and a second stud unit below the upper sleeve, and
the first stud unit has a smaller cross-section than the second stud unit.

6. The device of claim 2, wherein the upper sleeve further has an upper support unit.

7. The device of claim 6, wherein the upper support unit and the lower support unit are disposed along outer peripheral surfaces of the upper sleeve and the lower sleeve, respectively.

8. The device of claim 2, wherein the upper damper and the lower damper are elastic bodies.

9. The device of claim 2, wherein the upper damper and the lower damper have a quadrangular shape and corners of the dampers are rounded.

10. The device of claim 2, wherein:
a position guide is formed in the lower sleeve, and
the position guide is coupled with a protrusion guide formed in the weight sensor.

11. The device of claim 10, wherein:
the position guide is formed by a space recessed inside, and
the protrusion guide has a protrusion shape to be inserted into the position guide.

12. The device of claim 2, wherein a chamfer is formed at an end of one side of the stud unit.

13. The device of claim 5, wherein the first stud unit has a cylindrical shape and the second stud unit has a polygonal shape.

14. The device of claim 1, wherein the upper sleeve and the lower sleeve directly contact the stud unit.

15. The device of claim 1, wherein the upper sleeve has an upper support unit, a upper sleeve through-hole, and a bottom surface, the bottom surface of the upper sleeve being adjacent to a peripheral surface of the upper sleeve through-hole and to an inner peripheral surface of the upper support unit, the bottom surface of the upper sleeve being a planar surface.

16. The device of claim 2, wherein a peripheral surface of the upper damper through-hole, a peripheral surface of the lower damper through-hole, the peripheral surface of the lower sleeve through-hole, and a peripheral surface of the upper sleeve through-hole are substantially aligned in a direction perpendicular to the top surface of the lower sleeve.

* * * * *